US012749237B2

(12) United States Patent
Singh et al.

(10) Patent No.: US 12,749,237 B2
(45) Date of Patent: Sep. 29, 2026

(54) GENERATING AN INTERMEDIATE REPRESENTATION FOR CONVERTING BETWEEN LEGACY VECTOR PATHS AND VECTOR NETWORKS

(71) Applicant: Adobe Inc., San Jose, CA (US)

(72) Inventors: Siddharth J Singh, Noida (IN); Nikunj Goyal, Haridwar (IN); Vineet Batra, Pitam Pura (IN); Nilesh Mishra, Kanpur (IN)

(73) Assignee: Adobe Inc., San Jose, CA (US)

( * ) Notice: Subject to any disclaimer, the term of this patent is extended or adjusted under 35 U.S.C. 154(b) by 153 days.

(21) Appl. No.: 18/799,120

(22) Filed: Aug. 9, 2024

(65) Prior Publication Data

US 2026/0045003 A1 Feb. 12, 2026

(51) Int. Cl.
*G06T 11/23* (2026.01)
*G06T 11/60* (2026.01)
*G06V 10/46* (2022.01)

(52) U.S. Cl.
CPC .............. *G06T 11/23* (2026.01); *G06T 11/60* (2013.01); *G06V 10/46* (2022.01)

(58) Field of Classification Search
None
See application file for complete search history.

(56) References Cited

U.S. PATENT DOCUMENTS 6,879,946 B2 * 4/2005 Rong ...................... G06T 17/00 703/2
12,086,911 B2 9/2024 Phogat et al.
2007/0200873 A1 * 8/2007 Hsu ......................... G06T 11/60 345/629
2011/0175916 A1 * 7/2011 Noris .................. G06V 10/469 345/441
2013/0127856 A1 * 5/2013 Winnemoeller ........ G06T 17/20 345/423
2013/0332476 A1 * 12/2013 Sinha ...................... G06F 16/29 707/756
2014/0320540 A1 * 10/2014 Deach ....................... G06T 3/40 345/666
2022/0277501 A1 * 9/2022 Chandil .................. G06T 11/23

OTHER PUBLICATIONS

Paul E. Black, "k-dimensional", in Dictionary of Algorithms and Data Structures [online], Paul E. Black, ed. Dec. 17, 2004. (accessed Today) Available from: https://www.nist.gov/dads/HTML/kdimensional.html.

* cited by examiner

*Primary Examiner* — Anh-Tuan V Nguyen
(74) *Attorney, Agent, or Firm* — Keller Preece PLLC

(57) ABSTRACT

Methods, systems, and non-transitory computer readable storage media are disclosed for utilizing a bidirectional intermediate representation to convert between different path representations of a vector image. The disclosed system determines vertices at points of a plurality of paths in a vector image. The disclosed systems determines pairs of points connected by primitives corresponding to the plurality of paths. The disclosed system generates a bidirectional intermediate representation of a vector image comprising the vertices at the points connected by edges representing the primitives according to the pairs of points. Additionally, the disclosed system converts a first path representation of the plurality of paths of the vector image to a second path representation of the plurality of paths of the vector image utilizing the bidirectional intermediate representation.

20 Claims, 11 Drawing Sheets

GENERATING AN INTERMEDIATE REPRESENTATION FOR CONVERTING BETWEEN LEGACY VECTOR PATHS AND VECTOR NETWORKS

BACKGROUND

Many tasks involving digital media utilize vector images due to the lossless, scalable nature of vector images. For example, many entities utilize vector images in a wide range of digital content due to the flexibility and accuracy in portraying objects when rendering for display on a display device or in physical media printed from digital media. Traditionally, vector images store object data using paths defined by end points and control data indicating paths between the end points, rather than a collection of pixels, as in raster images. Additionally, newer methods of representing vector images include networks of junctions and pairs of junctions indicating primitives connecting the junctions. Because image editing applications are designed around the traditional method of storing vector image data, many tools of the image editing applications do not work with the other methods of representing vector image data. Conventional image editing systems lack any functionality for operating with different vector image representation schemas.

SUMMARY

One or more embodiments provide benefits and/or solve one or more of the foregoing or other problems in the art with systems, methods, and non-transitory computer readable storage media for converting between different representations of paths a vector image using a bidirectional intermediate representation. In particular, disclosed systems generate a bidirectional intermediate representation of a vector image by determining vertices at points of a plurality of paths (e.g., end points of Bezier curves or junctions in a vector network graph). The disclosed systems generate the bidirectional intermediate representation by connecting the vertices using edges representing primitives based on pairs of points (e.g., representing the Bezier curves or primitives corresponding to pairs of junctions). In some embodiments, the disclosed systems utilize the bidirectional intermediate representation to convert from a vector network graph of the vector image to legacy paths (e.g., Bezier curves). Furthermore, in some embodiments, the disclosed systems utilize the bidirectional intermediate representation to convert from legacy paths to a vector network graph. The disclosed systems thus provide fast, accurate, and flexible conversion between different representations of a vector image for use with various image editing tools.

BRIEF DESCRIPTION OF THE DRAWINGS

Various embodiments will be described and explained with additional specificity and detail through the use of the accompanying drawings.

DETAILED DESCRIPTION

Figure 1:
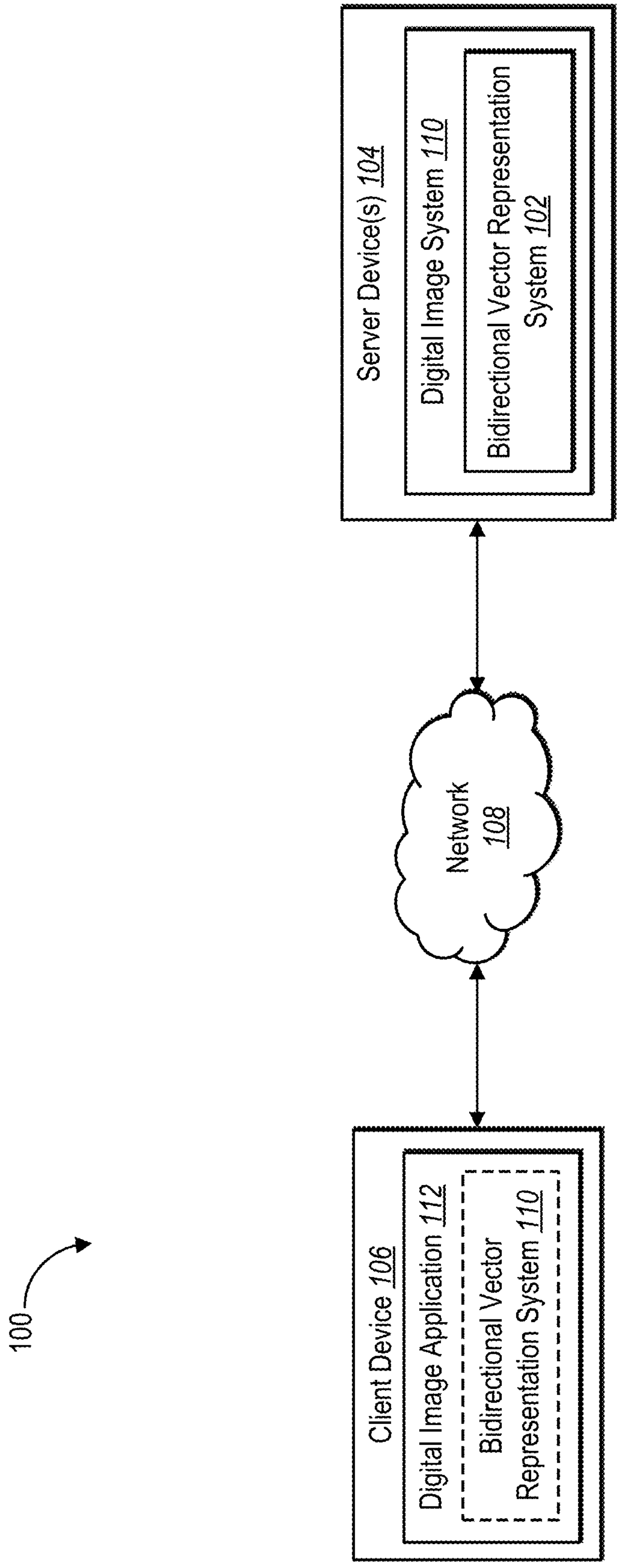
FIG. 1 illustrates an example system environment in which a bidirectional vector representation system operates in accordance with one or more implementations.

One or more embodiments of the present disclosure include a bidirectional vector representation system that uses a bidirectional intermediate representation to convert between different representations of a vector image. Specifically, the bidirectional vector representation system utilizes vector image data to generate a bidirectional intermediate representation of a vector image by determining vertices corresponding to points connecting paths and edges corresponding to the paths between the points. By generating the bidirectional intermediate representation, the bidirectional vector representation system provides a bridge between a plurality of different representations (e.g., data structures) of the vector image. For example, the bidirectional vector representation system utilizes the bidirectional intermediate representation to convert between Bezier curves and vector network graphs.

As mentioned, the bidirectional vector representation system generates a bidirectional intermediate representation for use as a bridge between a plurality of different representations of a vector image. In one or more embodiments, the bidirectional vector representation system generates the bidirectional intermediate representation from a vector network graph representation of the vector image for converting to a legacy path representation (e.g., using Bezier curves). For example, the bidirectional vector representation system determines a set of junctions corresponding to shared points in the vector image and pairs of junctions corresponding to primitives. The bidirectional vector representation system generates the bidirectional intermediate representation by generating vertices and edges in a graph representation of the vector image based on the set of junctions and primitives, respectively.

In some embodiments, the bidirectional vector representation system generates the bidirectional intermediate representation from a legacy path representation for converting to a vector network graph representation. For instance, the bidirectional vector representation system determines end points and control points of Bezier curves in the vector image. The bidirectional vector representation system generates the bidirectional intermediate representation by generating vertices and edges in a graph representation of the vector image based on the end points and control points, respectively.

Additionally, the bidirectional vector representation system utilizes the bidirectional intermediate representation to convert from a vector network graph representation to a legacy path representation or vice-versa. To illustrate, the bidirectional vector representation system converts the bidirectional intermediate representation to a legacy path representation by utilizing an edge visitor to visit edges in the bidirectional intermediate representation and generate end points and control points of Bezier curves. The bidirectional vector representation system converts the bidirectional intermediate representation to a vector network graph by converting vertices to junctions and edges to primitives for pairs of junctions. In some embodiments, the bidirectional vector representation system also generates the bidirectional intermediate representation to include separately stored edge sequences that store color information for closed paths for use in converting between vector network graphs and Bezier curves.

Conventional systems that provide vector image editing are configured to operate on vector images with legacy path representations. Specifically, conventional systems typically utilize editing tools (e.g., digital pens/pencils, erasers) configured to work with Bezier curves. For example, the conventional systems store new path data as Bezier curves (e.g., via anchor points and control points) and access Bezier curve data to apply one or more modifications to the path data based on interactions via various image editing tools. Although such tools are useful for generating and interacting with legacy path representations of vector images, conventional systems that rely solely on legacy path representations are limited in flexibility. More specifically, the conventional systems are unable to connect multiple paths at a single shared point (e.g., a junction) due to constraints on the legacy path representations.

Additionally, due to their inability to connect multiple paths at shared points, conventional systems also lack accuracy and usability in generating/displaying vector image content. For instance, when creating and rendering a vector image with multiple converging paths using legacy path representations, creating multiple path sets that converge at a single point result in disjoint sets of objects. Furthermore, minor errors or differences in positions of end points of the converging paths result in visual artifacts when rendering the disjoint sets of objects, such as extra edges/boundaries or misaligned paths.

The bidirectional vector representation system provides a number of advantages in computing systems that edit vector images. For example, the bidirectional vector representation system provides accurate and flexible editing of vector images using a plurality of different representations of vector image data. In contrast to conventional systems that provide vector image editing for only legacy path representations, the bidirectional vector representation system provides vector image editing utilizing legacy path representations and vector network graph representations. In particular, the bidirectional vector representation system generates a bidirectional intermediate representation for converting between legacy paths and vector network graphs for a single vector image. Thus, the bidirectional vector representation system improves the flexibility of vector image operations by utilizing the bidirectional intermediate representation to convert between the different representations depending on the specific tool or operation. Additionally, the bidirectional vector representation system provide backward compatibility with older data structures to provide seamless transition experiences in graphical user interfaces for users.

Furthermore, the bidirectional vector representation system provides improved accuracy in vector images. Specifically, the bidirectional vector representation system utilizes a bidirectional intermediate representation of a vector image to provide access to tools interacting with legacy paths while also leveraging the accuracy advantages of vector network graphs. To illustrate, in contrast to conventional systems that rely on legacy paths for vector images, the bidirectional vector representation system converts between legacy paths and vector network graphs to provide the rendering accuracy of shared points (e.g., junctions) for operations involving Bezier curves. Thus, the bidirectional vector representation system utilizes bidirectional intermediate representations to reduce or eliminate rendering artifacts at points where multiple paths meet in vector images.

The bidirectional vector representation system also provides improved digital storage via the use of bidirectional intermediate representations. For example, the bidirectional vector representation system manages the consumption of memory via bidirectional intermediate representations at runtime. In particular, the bidirectional vector representation system stores the processed paths/primitives during bridge operations such that the bidirectional vector representation system is able to remove the paths/primitives after processing to minimize memory usage.

Turning now to the figures, FIG. 1 includes an embodiment of a system environment 100 in which a bidirectional vector representation system 102 is implemented. In particular, the system environment 100 includes server device(s) 104 and a client device 106 in communication via a network 108. Moreover, as shown, the server device(s) 104 include a digital image system 110, which includes the bidirectional vector representation system 102. Furthermore, the client device 106 includes a digital image application 112, which optionally includes the bidirectional vector representation system 102 (or the digital image system 110).

As shown in FIG. 1, the client device 106 or the server device(s) 104 include or host the digital image system 110. The digital image system 110 includes, or is part of, one or more systems that implement digital image generation or editing operations. For example, the digital image system 110 provides tools for generating or editing digital images (e.g., vector images). To illustrate, the digital image system 110 communicates with the client device 106 via the network 108 to provide the tools for display and interaction via the digital image application 112 at the client device 106. Additionally, in some embodiments, the digital image system 110 receives requests to access digital image data stored (e.g., at the server device(s) 104 or at another device such as a database) and/or requests to store digital image data. In some embodiments, the digital image system 110 receives interaction data for viewing or performing various image processing operations and provides the results of the interaction data (e.g., generated digital image data) for display via the digital image application 112 or to a third-party system.

According to one or more embodiments, the digital image system 110 utilizes the bidirectional vector representation system 102 to edit vector images. In particular, the bidirectional vector representation system 102 generates a bidirectional intermediate representation to convert different representations of vector image data of a vector image in connection with various image editing operations. In particular, the bidirectional vector representation system 102 utilizes the bidirectional intermediate representation to convert between vector network graph representations of vector images to legacy path representations (e.g., Bezier curves), and vice-versa, in connection with performing various operations that are incompatible with one or the other representation. To illustrate, the bidirectional vector representation system 102 generates a bidirectional intermediate representation to convert between separate representations of a vector image in connection with utilizing certain tools that are incompatible with tools configured to operate on legacy paths. In one or more embodiments, the digital image system 110 provides the vector image to the client device 106 via the digital image application 112, such as for display and/or downstream operations.

As illustrated in FIG. 1, the bidirectional vector representation system 102 is implemented on the client device 106 or on the server device(s) 104. In particular, in some implementations, the bidirectional vector representation system 102 on the server device(s) 104 supports the bidirectional vector representation system 102 on the client device 106. For instance, the server device(s) 104 generates or obtains the bidirectional vector representation system 102 for the client device 106 (e.g., as part of a software application or suite). The server device(s) 104 provides the bidirectional vector representation system 102 to the client device 106 for performing digital image editing processes at the client device 106. In other words, the client device 106 obtains (e.g., downloads) the bidirectional vector representation system 102 from the server device(s) 104. At this point, the client device 106 is able to utilize the bidirectional vector representation system 102 to edit digital images independently from the server device(s) 104.

In additional embodiments, although FIG. 1 illustrates the server device(s) 104 and the client device 106 communicating via the network 108, the various components of the system environment 100 communicate and/or interact via other methods (e.g., the server device(s) 104 and the client device 106 communicate directly). Furthermore, although FIG. 1 illustrates the bidirectional vector representation system 102 being implemented by a particular component and/or device within the system environment 100, the bidirectional vector representation system 102 is implemented, in whole or in part, by other computing devices and/or components in the system environment 100. For example, in some embodiments, the server device(s) 104 include or host the digital image system 110 and/or the bidirectional vector representation system 102.

To illustrate, the bidirectional vector representation system 102 includes a web hosting application that allows the client device 106 to interact with content and services hosted on the server device(s) 104 (e.g., in a software as a service implementation). To illustrate, in one or more implementations, the client device 106 accesses a web page supported by the server device(s) 104. The client device 106 provides input to the server device(s) 104 to view information for image editing tasks and, in response, the bidirectional vector representation system 102 or the digital image system 110 on the server device(s) 104 performs operations to edit vector images via a bidirectional intermediate representation. The server device(s) 104 provide the output or results of the operations to the client device 106.

In one or more embodiments, the server device(s) 104 include a variety of computing devices, including those described below with reference to FIG. 11. For example, the server device(s) 104 include one or more servers for storing and processing data associated with image editing processes. In some embodiments, the server device(s) 104 also include a plurality of computing devices in communication with each other, such as in a distributed storage environment. In some embodiments, the server device(s) 104 include a content server. The server device(s) 104 also optionally include an application server, a communication server, a web-hosting server, a social networking server, a digital content campaign server, or a digital communication management server.

In addition, as shown in FIG. 1, the system environment 100 includes the client device 106. In one or more embodiments, the client device 106 includes, but is not limited to, a mobile device (e.g., smartphone or tablet), a laptop, a desktop, including those explained below with reference to FIG. 11). Furthermore, although not shown in FIG. 1, the client device 106 is operable by a user (e.g., a user included in, or associated with, the system environment 100) to perform a variety of functions. In particular, the client device 106 performs functions such as, but not limited to, accessing, viewing, generating, and editing digital images. In some embodiments, the client device 106 also performs functions for generating, capturing, or accessing data to provide to the digital image system 110 and the bidirectional vector representation system 102 in connection with editing digital images. For example, the client device 106 communicates with the server device(s) 104 via the network 108 to provide information (e.g., user interactions) associated with digital images. Although FIG. 1 illustrates the system environment 100 with a single client device, in some embodiments, the system environment 100 includes a different number of client devices.

Additionally, as shown in FIG. 1, the system environment 100 includes the network 108. The network 108 enables communication between components of the system environment 100. In one or more embodiments, the network 108 may include the Internet or World Wide Web. Additionally, the network 108 optionally include various types of networks that use various communication technology and protocols, such as a corporate intranet, a virtual private network (VPN), a local area network (LAN), a wireless local network (WLAN), a cellular network, a wide area network (WAN), a metropolitan area network (MAN), or a combination of two or more such networks. Indeed, the server device(s) 104 and the client device 106 communicates via the network using one or more communication platforms and technologies suitable for transporting data and/or communication signals, including any known communication technologies, devices, media, and protocols supportive of data communications, examples of which are described with reference to FIG. 11.

Figure 2:
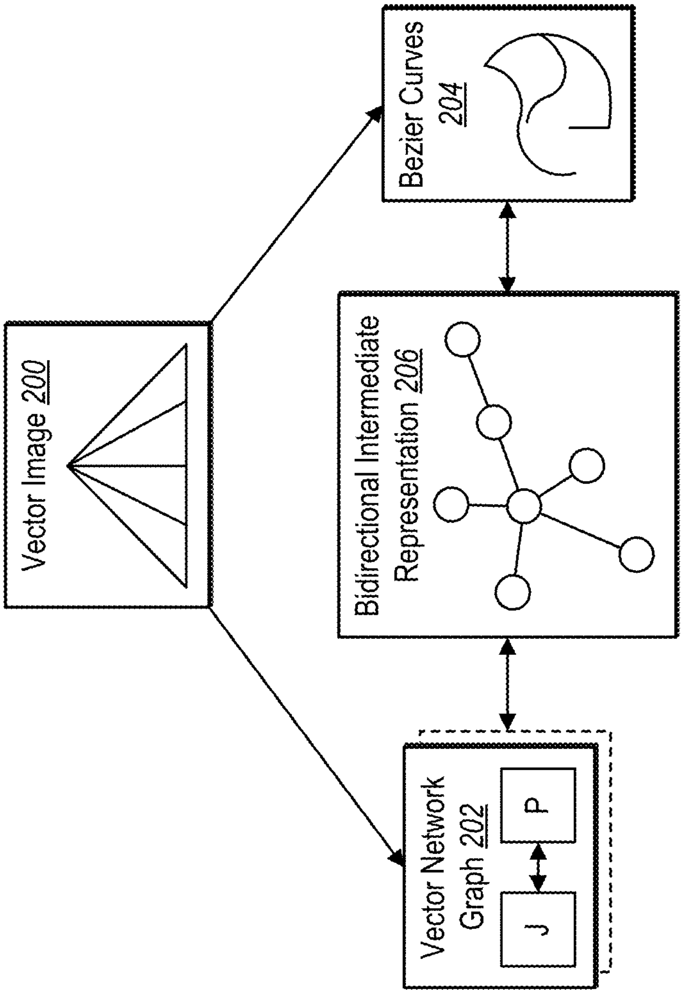
FIG. 2 illustrates a diagram of an overview of the bidirectional vector representation system generating a bidirectional intermediate representation for converting between different representations of vector image content in accordance with one or more implementations.

As mentioned, the bidirectional vector representation system 102 utilizes a bidirectional intermediate representation to convert between different representations of a vector image for various vector image operations. FIG. 2 illustrates an overview diagram of the bidirectional vector representation system 102 utilizing a bidirectional intermediate representation to convert between different path representations of a vector image. In particular, FIG. 2 illustrates that the bidirectional vector representation system 102 converts between one or more vector network graphs and Bezier curves representing vector image content.

In one or more embodiments, the bidirectional vector representation system 102 determines a vector image 200. Specifically, the vector image 200 includes visual information represented as paths and points. For example, the vector image 200 includes paths that form objects according to various ways of representing the paths, as described in more detail below. To illustrate, the vector image 200 includes one or more objects, each object made up of one or more paths and including end points that define the bounds of the paths. Furthermore, in one or more embodiments, a path in a vector image includes a shape (e.g., straight line, curve(s)) indicating a direction of the path.

As mentioned, in one or more embodiments, the vector image 200 is associated with one or more path representations that indicate how to store path data defining the paths and points in the vector image 200. Specifically, a path representation of a vector image 200 includes a data structure that stores visual information of the vector image 200 based on one or more paths in the vector image 200. For example, a path representation includes data indicating positions of points and shapes of paths between the points. Different path representations of a single vector image include different types of data structures to represent the same vector image data, such as legacy paths (e.g., Bezier curves) or vector network graphs.

In one or more embodiments, as illustrated in FIG. 2, the bidirectional vector representation system 102 obtains a vector network graph 202 and/or Bezier curves 204 representing the vector image 200. To illustrate, the bidirectional vector representation system 102 accesses the vector network graph 202 and/or the Bezier curves 204 from an image file corresponding to the vector image 200. In some embodiments, the bidirectional vector representation system 102 generates the vector network graph 202 or the Bezier curves 204 in connection with converting from a first path representation to a second path representation.

According to one or more embodiments, the vector network graph 202 includes a nonlinear graph representation of paths in the vector image 200 utilizing junctions and primitives corresponding to pairs of junctions. In some embodiments, the vector network graph 202 does not store information about adjacency of the paths to improve speed and efficiency of processing the vector image 200. According to one or more implementations, the vector network graph 202 includes a nonlinear graph of vector image data as described in "NONLINEAR REPRESENTATIONS FOR VECTOR OBJECTS," U.S. application Ser. No. 17/960,582, filed Oct. 5, 2022, which is herein incorporated by reference in its entirety.

Additionally, according to one or more embodiments, the Bezier curves 204 correspond to legacy path data including parametric curve representations of paths in the vector image 200. For example, a Bezier curve includes end points and control points defining the position and shapes of a path. To illustrate, a legacy path representation includes a plurality of anchor points indicating the end points of one or more curves. Additionally, a legacy path representation includes control points that define a smooth, continuous curve via a mathematical calculation based on positions of the control points and anchor points.

As illustrated in FIG. 2, the bidirectional vector representation system 102 generates a bidirectional intermediate representation 206 as a bridge between the vector network graph 202 and the Bezier curves 204. In particular, the bidirectional vector representation system 102 generates the bidirectional intermediate representation 206 from the vector network graph 202 or the Bezier curves 204 according to the specific implementation. For example, in response to determining that the vector image 200 is stored as the vector network graph 202 (or a plurality of vector network graphs), the bidirectional vector representation system 102 generates the bidirectional intermediate representation 206 from the vector network graph 202. Alternatively, in response to determining that the vector image 200 is stored as Bezier curves 204 (e.g., a legacy path representation), the bidirectional vector representation system 102 generates the bidirectional intermediate representation 206 from the Bezier curves 204.

In one or more additional embodiments, the bidirectional vector representation system 102 utilizes the bidirectional intermediate representation 206 to convert between different representations of the vector image 200 for various purposes. For instance, the bidirectional vector representation system 102 utilizes the bidirectional intermediate representation 206 to convert from the vector network graph 202 to the Bezier curves 204 in connection with utilizing a tool that is not configured to work with vector network graphs. Additionally, in some embodiments, the bidirectional vector representation system 102 utilizes the bidirectional intermediate representation 206 to convert from the Bezier curves 204 to the vector network graph 202 in connection with saving a file including the vector image 200 or for use with one or more additional tools.

Figure 3:
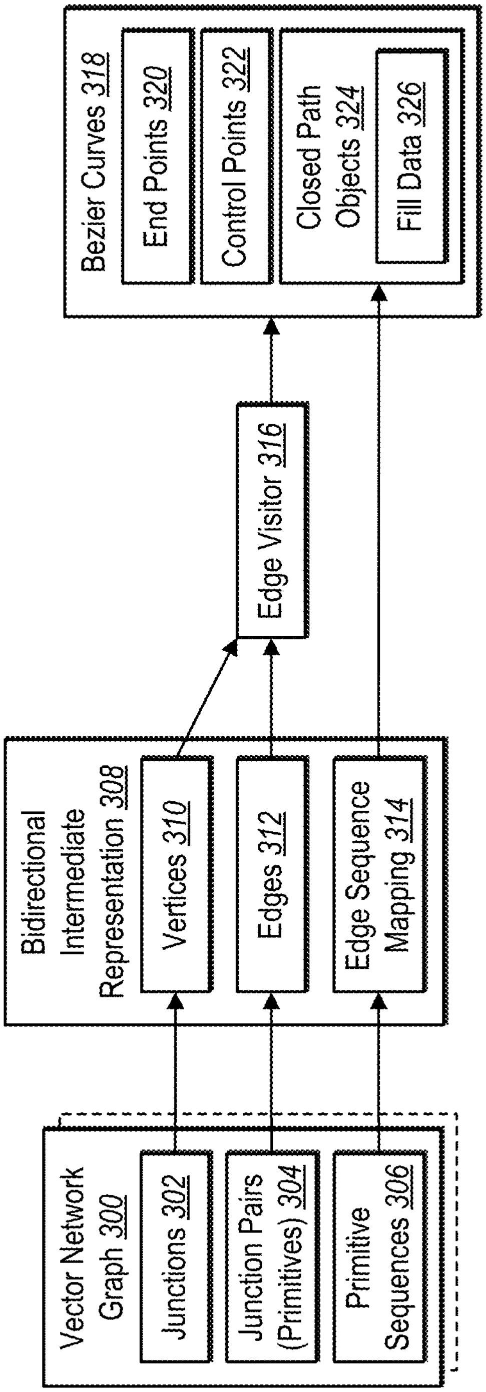
FIG. 3 illustrates a diagram of a process for converting a vector network graph to Bezier curves utilizing a bidirectional intermediate representation in accordance with one or more implementations.
Figure 4:
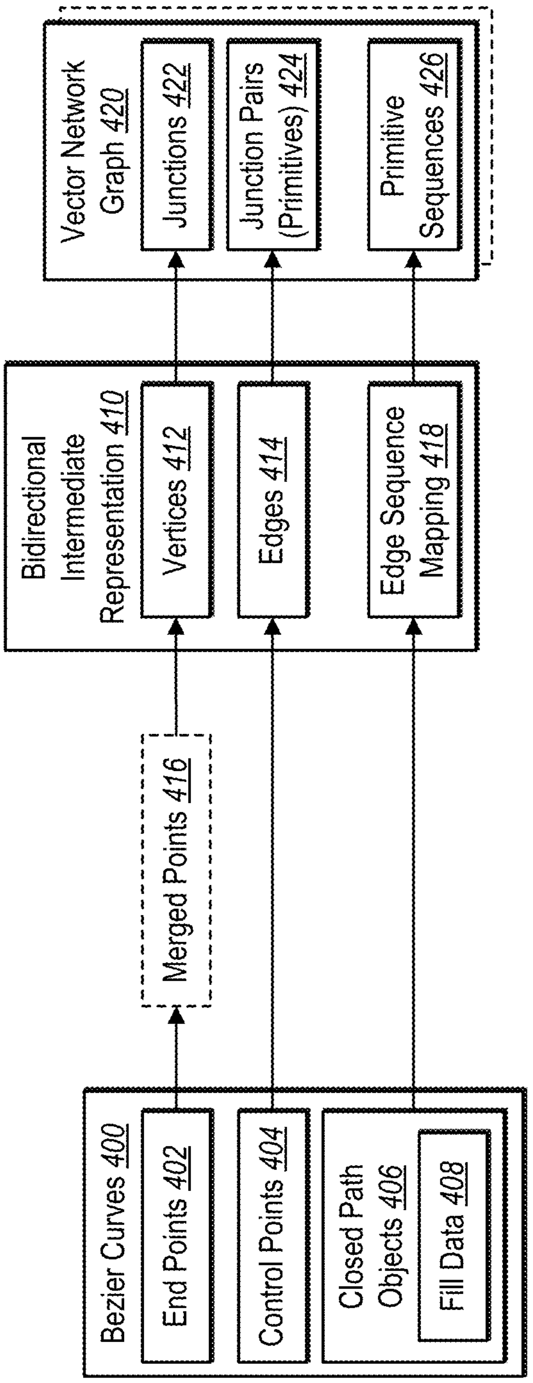
FIG. 4 illustrates a diagram of a process for converting Bezier curves to a vector network graph utilizing a bidirectional intermediate representation in accordance with one or more implementations.

In various embodiments, the bidirectional vector representation system 102 converts between different representations of a vector image via a bidirectional intermediate representation of the vector image. FIG. 3 illustrates an embodiment of the bidirectional vector representation system 102 utilizing a bidirectional intermediate representation to convert from one or more vector network graphs to Bezier curves. FIG. 4 illustrates an embodiment of the bidirectional vector representation system 102 utilizing a bidirectional intermediate representation to convert from Bezier curves to one or more vector network graphs.

As mentioned, in some embodiments, the bidirectional vector representation system 102 utilizes a bidirectional intermediate representation to convert from a vector network graph representation to a legacy path representation. FIG. 3 illustrates that the bidirectional vector representation system 102 determines a vector network graph 300 of a vector image. In particular, the bidirectional vector representation system 102 determines the vector network graph 300 by determining junctions 302 corresponding to points of paths in the vector image (e.g., from XML data in an SVG or other vector image file). For example, the junctions 302 include shared points involving a plurality of segments joined at the same point. In some embodiments, the junctions 302 include shared points involving at least three segments joined at the same point.

Additionally, as illustrated, the bidirectional vector representation system 102 determines junction pairs 304 corresponding to primitives. Specifically, the bidirectional vector representation system 102 determines a pair of junctions (i.e., two junctions of the junctions 302) that have a primitive connecting the pair of junctions. For example, the bidirectional vector representation system 102 determines primitives including arbitrary parametrizable curves such as lines, cubic Bezier curves, circular arcs, etc. Accordingly, the bidirectional vector representation system 102 stores the vector network graph 300 as a nonlinear graph including the junctions 302 and the junction pairs 304 (with corresponding primitives). In additional embodiments, the bidirectional vector representation system 102 also stores primitive sequences 306 (if applicable) in the vector network graph 300 based on connected primitives that form closed paths including specific color information (e.g., color fill information).

In one or more embodiments, the bidirectional vector representation system 102 generates a bidirectional intermediate representation 308 based on the vector network graph 300. For example, the bidirectional vector representation system 102 generates the bidirectional intermediate representation 308 in response to a request to perform a particular operation on the vector image represented by the vector network graph 300. To illustrate, the bidirectional vector representation system 102 generates the bidirectional intermediate representation 308 in response to a selection of an image editing tool that is incompatible with vector network graphs and is compatible with Bezier curves (or other splines such as b-splines). In additional embodiments, the bidirectional vector representation system 102 generates the bidirectional intermediate representation 308 for the vector image in response to creation of the vector image (e.g., in preparation for future operations possibly requiring other path representations).

As illustrated in FIG. 3, the bidirectional vector representation system 102 generates the bidirectional intermediate representation 308 from the vector network graph 300 to store relational information associated with paths in the vector image. Specifically, the bidirectional vector representation system 102 generates the bidirectional intermediate representation 308 to include vertices 310 and edges 312 connecting the edges 312 to represent points and corresponding paths in the vector image. For instance, the bidirectional vector representation system 102 generates the bidirectional intermediate representation 308 from the vector network graph 300 by storing the junctions 302 as the vertices 310 with the primitives corresponding to the junction pairs 304 as the edges 312. More specifically, the vertices 310 contain information such as the $\mathbb{R}^2$ coordinates, and the edges 312 include information about the type of primitive and data corresponding to the curve such as control points.

In one or more additional embodiments, the bidirectional vector representation system 102 determines an edge sequence mapping 314 corresponding to the primitive sequences 306 of the vector network graph 300. In particular, the bidirectional vector representation system 102 generate a separate mapping that maps the primitives indicated by the primitive sequences 306 to corresponding edges in the bidirectional intermediate representation 308. Thus, the bidirectional vector representation system 102 stores an edge sequence that maps each primitive sequence to a corresponding edge sequence with corresponding color information, such that the bidirectional intermediate representation 308 includes the vertices 310, the edges 312, and the edge sequence mapping 314. Additionally, in some embodiments, the bidirectional vector representation system 102 generates the bidirectional intermediate representation 308 based on a plurality of vector network graphs (e.g., one vector network graph for each vector object in the vector image).

In one or more embodiments, the bidirectional vector representation system 102 converts the bidirectional intermediate representation 308 to a legacy path representation of vector objects in the vector image. As illustrated in FIG. 3, the bidirectional vector representation system 102 utilizes an edge visitor 316 to traverse the bidirectional intermediate representation 308 and convert the bidirectional intermediate representation 308 to the Bezier curves 318. Specifically, the bidirectional vector representation system 102 utilizes the edge visitor 316 to visit each of the edges 312 (and thus, the vertices 310) in the bidirectional intermediate representation 308. Based on the visited vertices 310 and edges 312, the bidirectional vector representation system 102 generates the Bezier curves to include end points 320 based on the vertices 310 with shapes indicated by control points 322 based on the edges 312. In one or more embodiments, if source vertices have a single connected edge, the bidirectional vector representation system 102 stores the Bezier data in an array and marks the edge as visited to limit the number of output paths (e.g., as described in more detail below with respect to FIG. 7).

In additional embodiments, the bidirectional vector representation system 102 determines closed path objects 324 based on the edge sequence mapping 314. In particular, FIG. 3 illustrates that the bidirectional vector representation system 102 iterates through the edge sequences indicated by the edge sequence mapping 314 and constructs the closed path objects 324. Additionally, the bidirectional vector representation system 102 assigns color information (e.g., fill data 326) with corresponding colors to the generated curve(s) in the closed path objects 324. Furthermore, in some embodiments, the bidirectional vector representation system 102 does not apply a stroke to the curves when assigning the fill data 326 to the closed path objects 324 and assigns the curves in the closed path objects 324 a lower Z-order than stroke paths to achieve visual similarity. Furthermore, for each of a plurality of vector network graphs, the bidirectional vector representation system 102 groups generated curves for improved path management.

Additionally, in some embodiments, the bidirectional vector representation system 102 converts from a legacy path representation to a vector network graph. For instance, FIG. 4 illustrates that the bidirectional vector representation system 102 converts from a set of Bezier curves of a vector image to one or more vector network graphs via a bidirectional intermediate representation. In various embodiments, the bidirectional vector representation system 102 converts from the legacy path representation to a vector network graph representation in response to a request to perform a specific operation, such as an image editing operation incompatible with Bezier curves or an operation to save the vector image in an image file, to utilize a tool that is only compatible with vector network graphs, or upon applying the effects of the image editing tool to the Bezier curves.

In connection with converting a path representation of a vector image from a legacy path representation to a vector network graph representation, FIG. 4 illustrates that the bidirectional vector representation system 102 determines Bezier curves 400 based on path data stored for the vector image (e.g., from XML data in an SVG file or other vector image file). Specifically, the bidirectional vector representation system 102 determines end points 402 of the Bezier curves 400. Additionally, the bidirectional vector representation system 102 determines control points 404 that define shapes of the Bezier curves 400.

Furthermore, as previously described, the bidirectional vector representation system 102 determines closed path objects 406 formed by a subset of Bezier curves. In particular, the bidirectional vector representation system 102 determines whether one or more Bezier curves form a closed path. For example, the bidirectional vector representation system 102 identifies individual curves that form closed paths (e.g., a single Bezier curve forming a circle) or sequences of curves that form closed paths. The bidirectional vector representation system 102 also determines color information (e.g., fill data 408) for the closed path object.

According to one or more embodiments, the bidirectional vector representation system 102 converts the Bezier curves 400 to a vector network graph representation via a bidirectional intermediate representation 410. Specifically, the bidirectional vector representation system 102 generates the bidirectional intermediate representation 410 from the Bezier curves 400 by converting points and curves to vertices 412 and edges 414. More specifically, the bidirectional vector representation system 102 adds the end points 402 as the vertices 412 and stores the control points 404 (and other control data) in the edges 414 of the bidirectional intermediate representation 410.

Additionally, in some embodiments, the bidirectional vector representation system 102 determines points in the Bezier curves 400 that likely belong to shared points. In particular, as noted, legacy path representations are not compatible with shared points corresponding to junctions (e.g., end points that belong to more than two curves). Accordingly, the bidirectional vector representation system 102 attempts to merge end points that are near to each other as a single point. For example, as described in more detail with respect to FIG. 5, the bidirectional vector representation system 102 determines merged points 416 to represent as one or more vertices in the bidirectional intermediate representation 410.

In one or more embodiments, the bidirectional vector representation system 102 converts the closed path objects 406 to an edge sequence mapping 418 indicating one or more sequences of edges that form closed paths. For instance, the bidirectional vector representation system 102 determines one or more connected Bezier curves that form a closed path and generate an edge sequence corresponding to the connected curve(s). Furthermore, the bidirectional vector representation system 102 stores information about the fill data 408 and/or other color information with the edge sequence mapping 418. In one or more embodiments, the bidirectional vector representation system 102 stores the edge sequence mapping 418 to indicate a set of contours separate from the vertices 412 and the edges 414 to indicate one or more vertices/edges that form closed paths for use in reconstructing a different path representation.

FIG. 4 illustrates that the bidirectional vector representation system 102 utilizes the bidirectional intermediate representation 410 to generate a vector network graph 420 (or a plurality of vector network graphs) from the Bezier curves 400. In particular, the bidirectional vector representation system 102 performs a similar conversion as described in relation to FIG. 3 above in the reverse direction. For instance, the bidirectional vector representation system 102 generates junctions 422 in a set of junctions from the vertices 412. Furthermore, the bidirectional vector representation system 102 generates junction pairs 424 (e.g., primitives corresponding to pairs of the junctions 422) from the edges 414. Additionally, the bidirectional vector representation system 102 determines primitive sequences 426 corresponding to the closed path objects 406 of the Bezier curves 400 based on the edge sequence mapping 418 (e.g., by determining primitives that form a closed path for the corresponding edges of the bidirectional intermediate representation 410 based on the edge sequence mapping 418).

In one or more embodiments, the bidirectional vector representation system 102 utilizes previously stored information to convert the Bezier curves 400 to the vector network graph 420. Specifically, the bidirectional vector representation system 102 utilizes a previously generated edge sequence mapping based on a previous conversion from a vector network graph to Bezier curves (e.g., as in FIG. 3) to map edge sequences from the bidirectional intermediate representation 410 to the vector network graph 420. To illustrate, the bidirectional vector representation system 102 utilizes the previous edge sequence mapping to update the vector network graph 420 with one or more modified edge sequences based one or more modifications to the Bezier curves 400. Similarly, in some embodiments, the bidirectional vector representation system 102 updates the junctions 422 and the junction pairs 424 based on modifications to the Bezier curves 400 as stored in the bidirectional intermediate representation 410.

Figure 5:
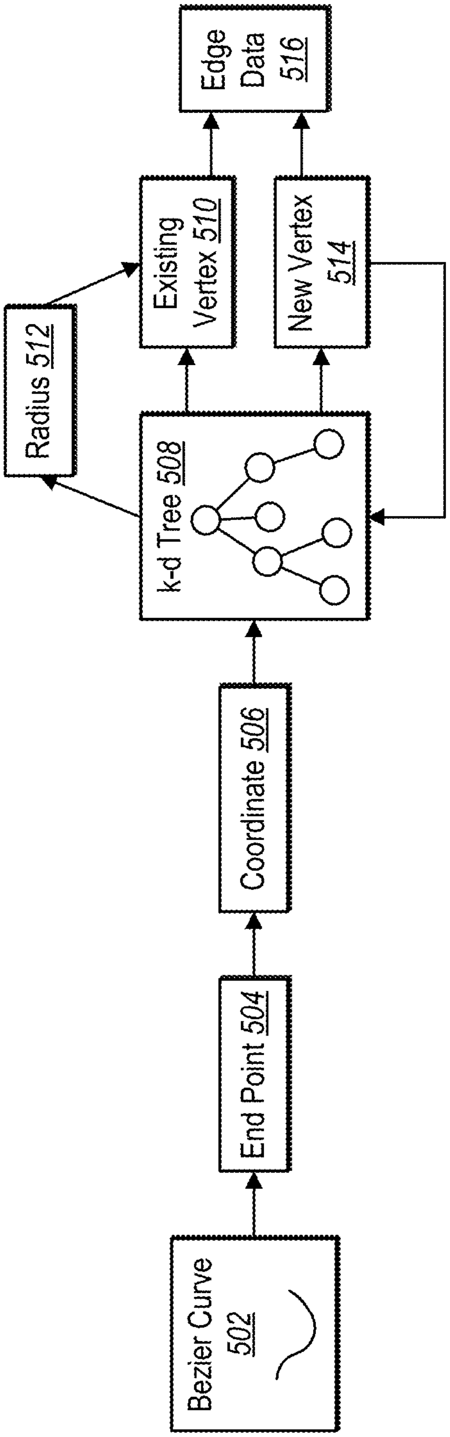
FIG. 5 illustrates a diagram of a process for determining vertices and edges for generating a bidirectional intermediate representation from a Bezier curve in accordance with one or more implementations.

As mentioned, in one or more embodiments, the bidirectional vector representation system 102 merges nearby points when converting from a set of Bezier curves to a vector network graph. FIG. 5 illustrates a process in which the bidirectional vector representation system 102 utilizes determines vertices and edges in a bidirectional intermediate representation based on path data for a Bezier curve of a vector image. Specifically, the bidirectional vector representation system 102 determines vertices and edges to include in a bidirectional intermediate representation based on points of the Bezier curves.

As illustrated in FIG. 5, the bidirectional vector representation system 102 determines a Bezier curve 502 from a legacy path representation of a vector image in connection with generating a bidirectional intermediate representation. The bidirectional vector representation system 102 determines an end point 504 corresponding to one end of the Bezier curve 502. In one or more embodiments, the bidirectional vector representation system 102 determines a coordinate 506 of the end point 504 based on the path data for the Bezier curve 502. For example, the bidirectional vector representation system 102 determines the coordinate 506 in an image coordinate plane corresponding to the vector image.

In response to determining the coordinate 506, the bidirectional vector representation system 102 utilizes the coordinate 506 to determine a vertex identifier for the end point 504. In one or more embodiments, as illustrated in FIG. 5, the bidirectional vector representation system 102 utilizes a k-d tree 508 to determine whether the bidirectional vector representation system 102 already has a vertex representing the end point 504. Specifically, the bidirectional vector representation system 102 performs a search on the k-d tree 508 utilizing the coordinates 506 to determine whether an existing vertex 510 has the coordinates 506. In response to identifying the existing vertex 510, the bidirectional vector representation system 102 determines the vertex identifier of the existing vertex 510 and assigns it to the end point 504 for the bidirectional intermediate representation. By utilizing the k-d tree, in some embodiments, the bidirectional vector representation system 102 provides optimal speed and efficiency of the conversion process by reducing the search space in a two-dimensional plane over linear searching.

Furthermore, in some embodiments, the bidirectional vector representation system 102 determines whether the existing vertex 510 has a similar coordinate to the coordinate 506 of the end point 504. In particular, the bidirectional vector representation system 102 determines whether the k-d tree 508 has any vertices with coordinates within a threshold distance (e.g., a radius 512) of the coordinate 506. For instance, the bidirectional vector representation system 102 determines whether there are any end points in the k-d tree 508 with coordinates within an open ball $B_\delta(p)$ of radius δ to an existing point p. If so, the bidirectional vector representation system 102 merges the points within the radius 512 into a single vertex (e.g., the existing vertex 510). Furthermore, in some embodiments, the radius 512 is parameterizable, such that a user can specify the radius 512 by interacting with a radius value within a graphical user interface.

In one or more additional embodiments, the bidirectional vector representation system 102 adds a new vertex 514 to the k-d tree 508 (and the bidirectional intermediate representation) based on coordinates for an end point. For example, in response to determining that the coordinate 506 of the end point 504 is not in the k-d tree 508 or within the radius 512 of the existing vertex, the bidirectional vector representation system 102 generates the new vertex 514. Additionally, the bidirectional vector representation system 102 adds coordinates associated with the new vertex 514 to the k-d tree 508 for use in determining whether the new vertex 514 corresponds to any other end points in the vector image.

In some embodiments, the bidirectional vector representation system 102 generates edge data 516 based on the vertices in the k-d tree 508. Specifically, the bidirectional vector representation system 102 adds information associated with the Bezier curve 502 to an edge in the bidirectional intermediate representation as the edge data 516. For example, the bidirectional vector representation system 102 stores control data (e.g., control points) and color information associated with the Bezier curve 502 to the edge. Additionally, by generating the bidirectional intermediate representation as a graph that links edges to vertices based on the corresponding Bezier curves, the bidirectional vector representation system 102 stores relational information for Bezier curves in the bidirectional intermediate representation.

In one or more embodiments, as mentioned, the bidirectional vector representation system 102 stores an edge sequence corresponding to closed paths as a separate mapping for use in determining fill data for closed path objects. The bidirectional vector representation system 102 generates edge sequence mappings for connected Bezier curves to use in creating primitive sequences when converting the bidirectional intermediate representation to one or more vector network graphs (e.g., for faster lookup). In some embodiments, the bidirectional vector representation system 102 ignores fill data for open paths corresponding to fill functions in legacy path representations. Alternatively, in some embodiments, the bidirectional vector representation system 102 auto-completes an open path by creating a hidden Bezier curve (e.g., not visible within a graphical user interface) that completes a closed path and a corresponding edge sequence in the bidirectional intermediate representation. The bidirectional vector representation system 102 generates a hidden primitive and stores the color information with a corresponding primitive sequence.

Figure 6:
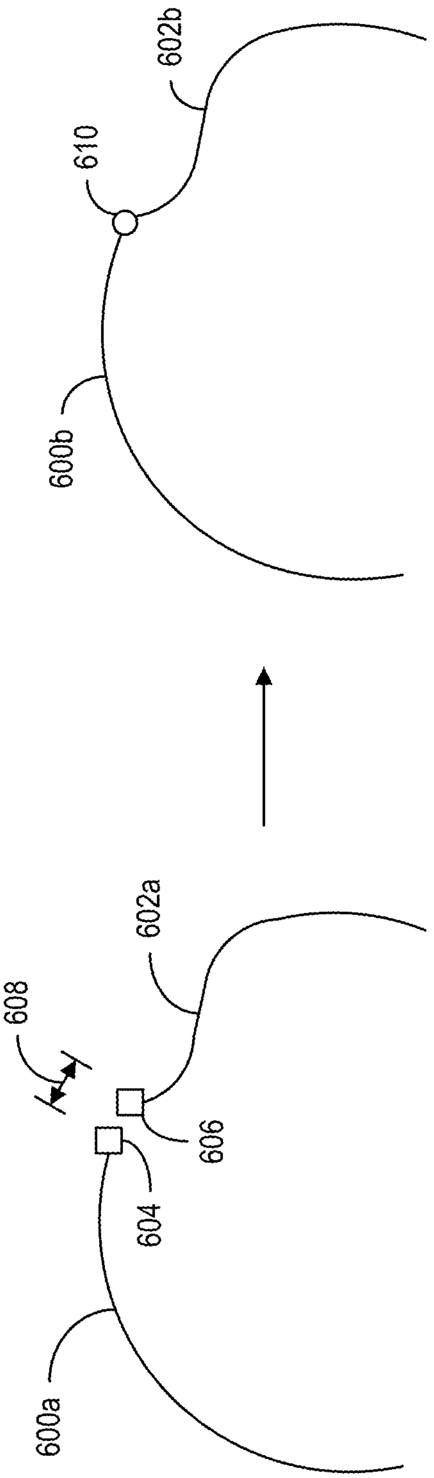
FIG. 6 illustrates a diagram of a point merging operation in connection with generating a bidirectional intermediate representation from Bezier curves in accordance with one or more implementations.

FIG. 6 illustrates an example of the bidirectional vector representation system 102 merging end points that are within a threshold distance of each other. Specifically, FIG. 6 illustrates a first Bezier curve 600*a* and a second Bezier curve 602*a* of a vector image. As illustrated, the Bezier curves include end points that are not in exactly the same coordinate position. For example, the first Bezier curve 600*a* includes a first end point 604, and the second Bezier curve 602*a* includes a second end point 606.

In one or more embodiments, in connection with generating a bidirectional intermediate representation from a legacy path representation, the bidirectional vector representation system 102 utilizes coordinates of an end point to determine whether a corresponding vertex already exists. For example, the bidirectional vector representation system 102 obtains the coordinates of the first end point 604 when processing the first Bezier curve 600*a*. Additionally, the bidirectional vector representation system searches for the coordinates of the first end point 604 in a list of existing vertices (e.g., in a k-d tree or a lookup list).

As noted previously, in some embodiments, the bidirectional vector representation system 102 to determine whether an existing vertex is an exact match or an approximate match to the first end point 604. Specifically, the bidirectional vector representation system 102 determines whether there are any existing vertices within a threshold distance 608 of the first end point 604. For instance, the bidirectional vector representation system 102 compares the coordinates of the first end point 604 to coordinates of existing vertices utilizing the lookup data structure. In response to determining that an existing vertex corresponds to the first end point 604 (e.g., an existing vertex for the second end point 606 is within the threshold distance 608 of the first end point 604), the bidirectional vector representation system 102 merges the first end point 604 with the second end point 606.

In one or more embodiments, the bidirectional vector representation system 102 merges the first end point 604 with the second end point 606 by adjusting a position of the first end point 604 and/or a position of the second end point 606. For example, the bidirectional vector representation system 102 changes coordinates for the first end point 604 to the coordinates of the second end point 606. In an alternative example, the bidirectional vector representation system 102 changes coordinates for the first end point 604 and the second end point 606, such as by moving both end points to a midpoint between the first end point 604 and the second end point 606.

As illustrated in FIG. 6, in connection with merging the first end point 604 with the second end point 606, the bidirectional vector representation system 102 modifies the corresponding paths. For instance, the bidirectional vector representation system 102 generates a modified first Bezier curve 600*b* and a modified second Bezier curve 602*b* when merging the first end point 604 and the second end point 606 at a merged point 610. Alternatively, in response to changing the coordinates of a single end point (e.g., the first end point 604), the bidirectional vector representation system 102 modifies only that Bezier curve (e.g., the first Bezier curve 600*a*) without modifying the other Bezier curve.

Although FIG. 6 illustrates an embodiment in which the bidirectional vector representation system 102 merges two end points, the bidirectional vector representation system 102 is able to merge more than one end point. For example, the bidirectional vector representation system 102 generates a bidirectional intermediate representation including vertices utilizing the above process for a plurality of end points of one or more Bezier curves. To illustrate, the bidirectional vector representation system 102 merges end points from three or more separate Bezier curves or multiple end points from a single Bezier curve. Thus, in some embodiments, the bidirectional vector representation system 102 creates closed paths or junctions by merging points depending on the Bezier curves and end points involved.

In one or more embodiments, when merging end points, the bidirectional vector representation system 102 does not modify the legacy path representation when merging end points of different Bezier curves initially. Instead, the bidirectional vector representation system 102 merges the points in the bidirectional intermediate representation, which results in merged points when converting to a vector network graph. Additionally, when converting from the vector network graph back to Bezier curves, the bidirectional vector representation system 102 generates the Bezier curves including end points with the modified positions (e.g., coincident coordinates) according to the vertices as stored in the bidirectional intermediate representation.

Figure 7:
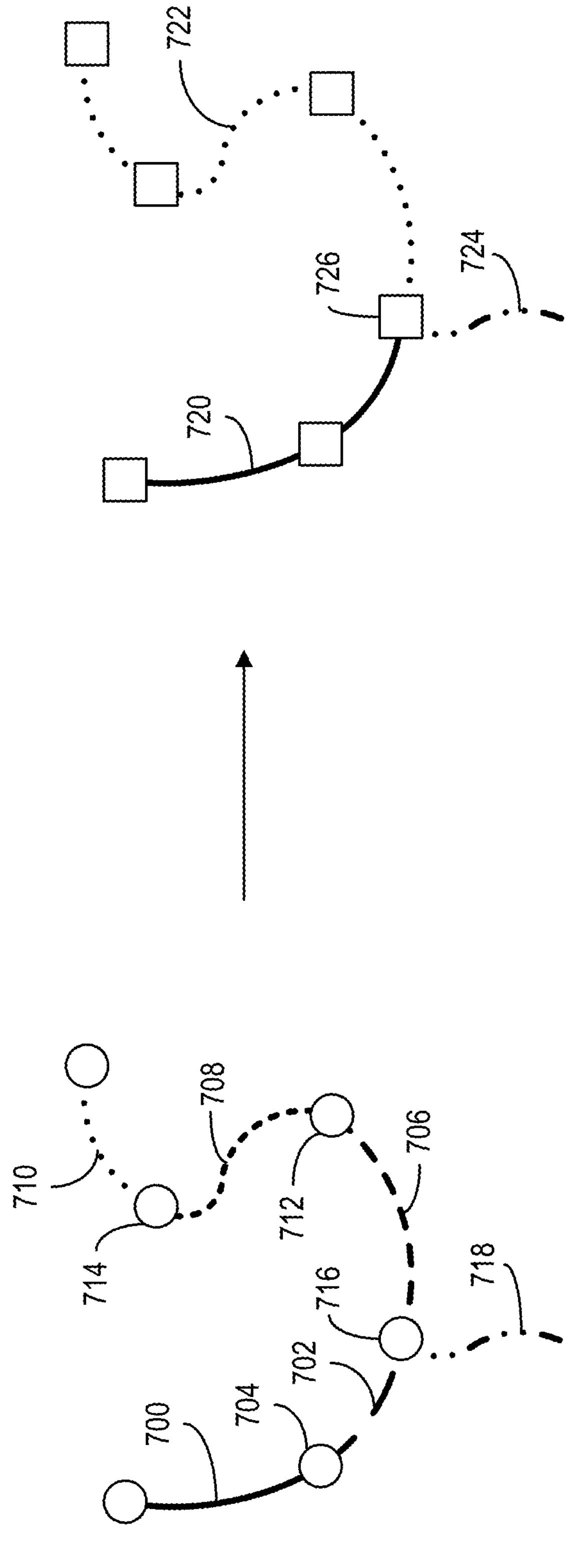
FIG. 7 illustrates a diagram of examples of a vector network graph converted to Bezier curves via a bidirectional intermediate representation in accordance with one or more implementations.

According to one or more embodiments, when converting from a vector network graph representation to a legacy path representation, the bidirectional vector representation system 102 combines two or more primitives from the vector network graph into a single Bezier curve. FIG. 7 illustrates an example set of primitives that the bidirectional vector representation system 102 combines into fewer Bezier curves via a bidirectional intermediate representation. In particular, the bidirectional vector representation system 102 combines a set of primitives into a single Bezier curve to limit the number of paths generated during conversion.

For example, FIG. 7 illustrates a vector image that includes a plurality of different primitives connected by a plurality of points and/or junctions according to a vector network graph for the vector image. In particular, FIG. 7 illustrates a first set of primitives including first primitive 700 and a second primitive 702 connected by a first junction 704. Furthermore, FIG. 7 illustrates a second set of primitives including a third primitive 706, a fourth primitive 708, and a fifth primitive 710 connected in sequence by a second junction 712 and a third junction 714. FIG. 7 also illustrates that the first set of primitives and the second set of primitives are connected by a fourth junction 716, which also connects the first set of primitives and the second set of primitives to a sixth primitive 718.

In some embodiments, as mentioned, the bidirectional vector representation system 102 utilizes an edge visitor to visit edges in the bidirectional intermediate representation representing the primitives and junctions. The bidirectional vector representation system 102 utilizes the edge visitor to run for the entire bidirectional intermediate representation and, in response to determining that a particular vertex has a single connected edge, the bidirectional vector representation system 102 generates/stores the corresponding Bezier data in an array and marks the edge as visited. Accordingly, when generating a Bezier curve from the bidirectional intermediate representation, the bidirectional vector representation system 102 utilizes the array of Bezier data to generate the output curve. As illustrated in FIG. 7, for example, the bidirectional vector representation system 102 combines the first set of primitives into a first path 720, the second set of primitives into a second path 722, and the sixth primitive 718 as a third path 724 all connected by a single anchor point 726 (which corresponds to the fourth junction 716).

Furthermore, when combining primitives in such a way, the bidirectional vector representation system 102 simplifies the color information stored for the Bezier curves. For instance, the bidirectional vector representation system 102 determines whether primitives connected as in FIG. 7 have similar color information prior to combining the primitives into a single path. To illustrate, the bidirectional vector representation system 102 determines whether color values assigned to the primitives are within a threshold value, and if so, combines the primitives into a single path as illustrated in FIG. 7. As an example, the bidirectional vector representation system 102 determines a median color value (e.g., on an RGB scale) based on a set of color values for a set of primitives and compares the individual color values of the primitives to the median color value. Additionally, the bidirectional vector representation system 102 determines whether a distance (e.g., a Euclidean distance) of each individual color value from the median color value satisfies a threshold value.

Figure 8:
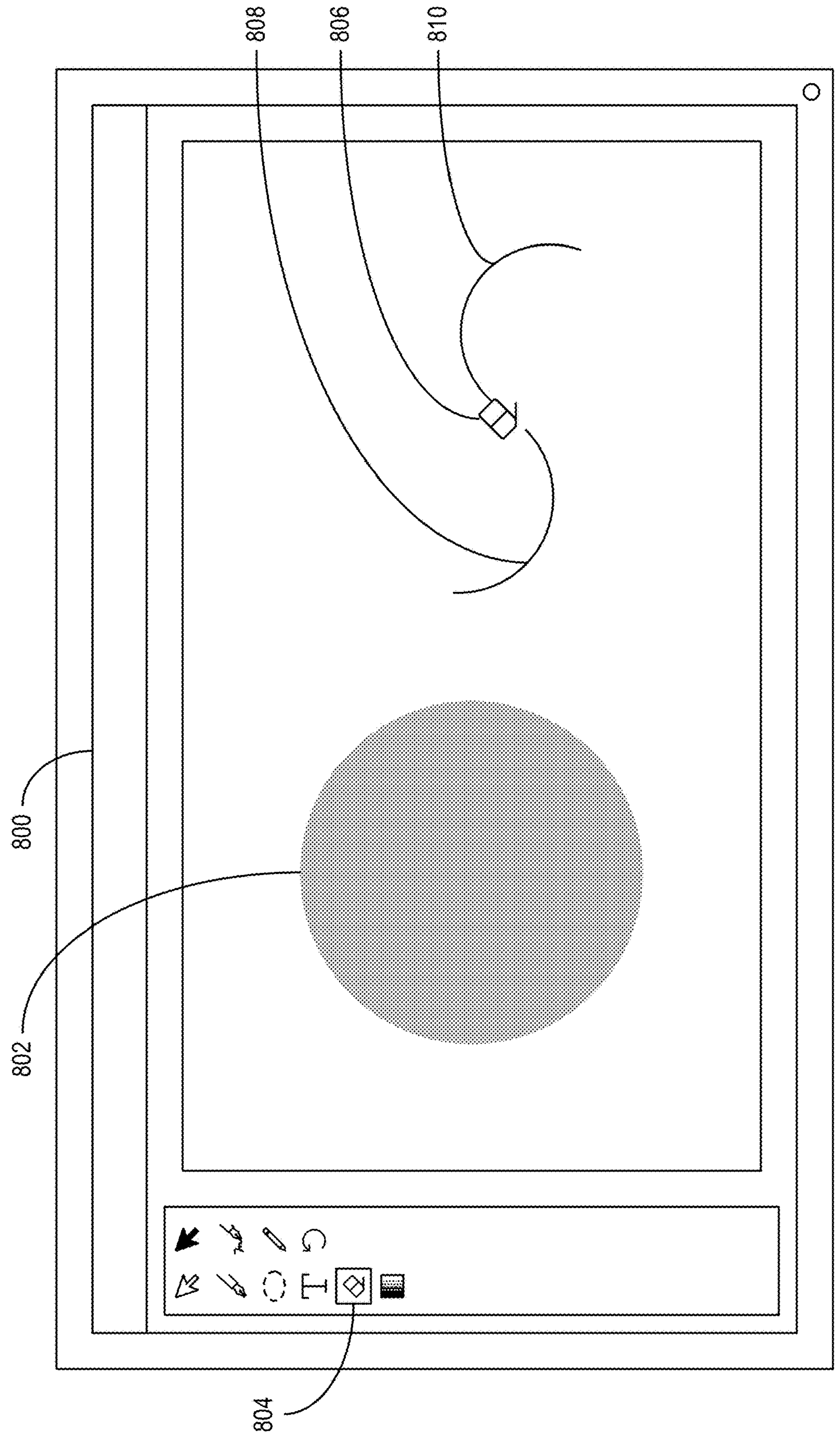
FIG. 8 illustrates a graphical user interface displaying a vector image based on a plurality of different representations in accordance with one or more implementations.

FIG. 8 illustrates an example of a graphical user interface 800 of a client device in connection with editing vector images using a plurality of different path representations. Specifically, the client device displays the graphical user interface 800 for a digital image application (e.g., a vector image editing application). In one or more embodiments, the client device displays one or more vector path objects of the vector image. For example, the client device displays a first vector image object 802 including a closed path formed by one or more primitives. As illustrated, the closed path includes fill data indicating a color value that fills a space formed by the closed path.

In connection with converting the first vector image object 802 between different path representations, the bidirectional vector representation system 102 utilizes a bidirectional intermediate representation as described previously. In particular, the bidirectional intermediate representation includes an edge sequence that maps the one or more paths in a path representation (e.g., one or more primitives in a vector network graph representation) to one or more edges in the bidirectional intermediate representation. The bidirectional vector representation system 102 stores the fill data with the edge sequence mapping for use in converting to a different path representation (e.g., a legacy path representation including Bezier curves).

According to one or more embodiments, the bidirectional vector representation system 102 converts one or more vector path objects of the vector image to a different path representation in response to a request to perform one or more operations on the vector image. For example, in response to a selection of a particular image editing tool that is incompatible with a current path representation of the vector image, the bidirectional vector representation system 102 converts the vector image to a different path representation. To illustrate, in response to determining that an eraser tool 804 is incompatible with vector network graphs, the bidirectional vector representation system 102 converts vector network graphs corresponding to the vector images in the vector image to Bezier curves. Thus, interactions with the components of the vector image with the eraser tool 804 cause the client device to perform such interactions on the Bezier curves, rather than the vector network graphs.

For example, as illustrated in FIG. 8, an input 806 to the client device to interact with a Bezier curve via the eraser tool 804 causes the client device to split the Bezier curve into a plurality of Bezier curves (a first curve 808 and a second curve 810). Additionally, in response to modifications to the Bezier curve(s) in the legacy path representation, the bidirectional vector representation system 102 updates the bidirectional intermediate representation based on the modifications, resulting in a different vector network graph representation after converting back to vector network graphs. Furthermore, in one or more embodiments, when splitting a single Bezier curve into a plurality of separate objects (e.g., not connected by any path or point), the bidirectional vector representation system 102 generates separate vector network graphs to represent the different vector objects during conversion to a vector network graph representation. In one or more embodiments, the bidirectional vector representation system 102 converts the legacy path representation back to vector network graphs in response to a request to save the vector image.

According to various embodiments, as described above, the bidirectional vector representation system 102 utilizes a bidirectional intermediate representation to convert between different path representations of a vector image. In one or more embodiments, the bidirectional vector representation system 102 converts from vector network graph representations to legacy path representations utilizing Algorithm 1 below:

Algorithm 1 Vector Network To Legacy Paths

```
Require: VN = set of all Junctions, Primitives, Contours, J, P, C
  for all j ∈ J do
    V = V ∪ {v}                                  ▷ Prepare v and insert in V
  end for
  for all p ∈ P do
    E = E ∪ {e}                                  ▷ Create e = {v_i, v_j} and insert in E
  end for
  for all c ∈ C do
    C' = C' ∪ {c}                                ▷ Create c = {e_i, e_j, e_k, ...} and insert in C'
  end for
Ensure: G = {V, E, C'}                           ▷ Intermediate Representation
Require: Run edge visitor
  1. Process unvisited edge, e_i = {v_i, v_j}, to check if either vertex has a single outgoing edge
  2. Fetch the single outgoing edge e_k, merge into single path and mark edge as visited
  3. Also store the merged path path_i with start-end points in a k-d tree
  4. Check if end-points of the current merged path path_i exists in k-d tree
  5. If there is an end-point match with an existing path path_j, merge path_i and path_j into path_k
  6. Remove end point coordinates for path_i and add coordinates for path_k in k-d tree
Ensure: Path = {path_i, path_j, path_k, ...}
  for all c' ∈ C' do
    fi = {bez_i, bez_j, bez_k, ...}              ▷ Process edge sequence c', and generate bezier curve sequence
    Face = Face ∪ {f_i}                          ▷ Append closed curves, faces to a set
  end for
Ensure: Face = {f_i, f_j, f_k, ...}
  Generate Stroke paths with empty fill for each path ∈ Path
  Generate closed curves with corresponding fill color for each face ∈ Face
```

Furthermore, in one or more embodiments, the bidirectional vector representation system 102 converts from legacy path representations to vector network graph representations utilizing Algorithm 2 below:

Algorithm 2 Legacy Paths to Vector Network

```
Require: LP = set of open and closed paths OL, CL
  for all ol ∈ OL do
    1. Process path segments in the open path to generate bezier curves
    2. Add end points of each curve in a k-d tree
    3. V = V ∪ {v}                               ▷ For every unique end point, generate v
    4. If a nearby end point already exists, extract the vertex v
    5. E = E ∪ {e}                               ▷Generate e = {v_i, v_j}, edges will always be unique
  end for
  for all cl ∈ CL do
    1. Process these paths exactly as done for OL
    2. Construct C' = C' ∪ {c}                   ▷ Create c' = {ei, ej, ek, ...} and insert in C'
    3. Also construct E2C : e_i- > c_j', map for lookup later.
  end for
Ensure: G = {V, E, C'}                           ▷ Intermediate Representation
Require: Finding set of all connected components(isolated subgraphs) in graph
  for all cc ∈ G do
    1. Create a new VN
    2. Process each edge e_i in the current subgraph
    3. Add vertex j_v and control j_c junctions, J = J ∪ {j_vi, ..., j_ei, ...}
    4. Add primitive P ∪ {p_i}
    5. If a contour, c_j' exists for e_i, store the contour sequences in VN as well and mark contour c_j' as processed.
  end for
Ensure: VN = {VN_i, VN_j, VN_k, ...} for each connected component
```

Figure 9:
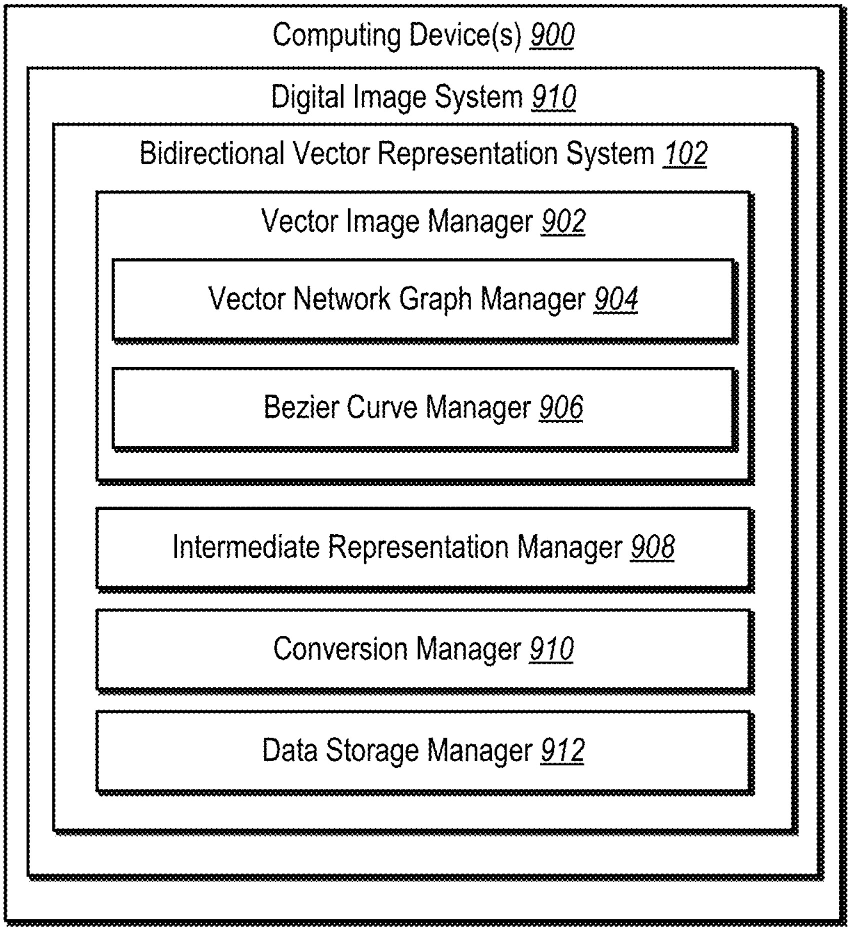
FIG. 9 illustrates a diagram of an example of the bidirectional vector representation system in accordance with one or more implementations.

FIG. 9 illustrates a detailed schematic diagram of an embodiment of the bidirectional vector representation system 102 described above. As shown, the bidirectional vector representation system 102 is implemented in a digital image system 110 on computing device(s) 900 (e.g., a client device and/or server device as described in FIG. 1, and as further described below in relation to FIG. 11). Additionally, the bidirectional vector representation system 102 includes, but is not limited to, a vector image manager 902 (including a vector network graph manager 904 and a Bezier curve manager 906), an intermediate representation manager 908, a conversion manager 910, and a data storage manager 912.

In one or more embodiments, the bidirectional vector representation system 102 is implemented on any number of computing devices. For example, the bidirectional vector representation system 102, in one or more embodiments, is implemented in a distributed system of server devices for digital image editing. Alternatively, the bidirectional vector representation system 102 is also implemented within one or more additional systems. For example, the bidirectional vector representation system 102, in one or more embodiments, is implemented on a single computing device such as a single client device.

In one or more embodiments, each of the components of the bidirectional vector representation system 102 is in communication with other components using any suitable communication technologies. Additionally, the components of the bidirectional vector representation system 102 are capable of being in communication with one or more other devices including other computing devices of a user, server devices (e.g., cloud storage devices), licensing servers, or other devices/systems. It will be recognized that although the components of the bidirectional vector representation system 102 are shown to be separate in FIG. 9, any of the subcomponents may be combined into fewer components, such as into a single component, or divided into more components as may serve a particular implementation. Furthermore, although the components of FIG. 9 are described in connection with the bidirectional vector representation system 102, at least some of the components for performing operations in conjunction with the bidirectional vector representation system 102 described herein are implemented on other devices within the environment in other embodiments.

In some embodiments, the components of the bidirectional vector representation system 102 include software, hardware, or both. For example, the components of the bidirectional vector representation system 102 include one or more instructions stored on a computer-readable storage medium and executable by processors of one or more computing devices (e.g., the computing device(s) 900). When executed by the one or more processors, the computer-executable instructions of the bidirectional vector representation system 102 cause the computing device(s) 900 to perform the operations described herein. Alternatively, the components of the bidirectional vector representation system 102 include hardware, such as a special purpose processing device to perform a certain function or group of functions. Additionally, or alternatively, the components of the bidirectional vector representation system 102 include a combination of computer-executable instructions and hardware.

Furthermore, the components of the bidirectional vector representation system 102 performing the functions described herein with respect to the bidirectional vector representation system 102 may, for example, be implemented as part of a stand-alone application, as a module of an application, as a plug-in for applications, as a library function or functions that may be called by other applications, and/or as a cloud-computing model. Thus, the components of the bidirectional vector representation system 102 may be implemented as part of a stand-alone application on a personal computing device or a mobile device. Alternatively, or additionally, the components of the bidirectional vector representation system 102 may be implemented in any application that provides digital image editing, including, but not limited to ADOBE® ILLUSTRATOR® and ADOBE® CREATIVE CLOUD® software.

As illustrated, the bidirectional vector representation system 102 includes a vector image manager 902 to manage digital images for image editing operations. In particular, the vector image manager 902 accesses digital images (e.g., vector images) for editing based on user inputs providing the digital images or accessing the digital images from a database of images. Additionally, the vector image manager 902 manages the display of image content within a digital image application in connection with various image editing tools.

The vector image manager 902 includes a vector network graph manager 904 and a Bezier curve manager 906. In particular, the vector network graph manager 904 generates, obtains, or otherwise accesses vector network graph representations of vector images. For example, the vector network graph manager 904 generates vector network graph representations of vector images including junctions and pairs of junctions (e.g., corresponding to primitives) to represent paths and objects in the vector images. Additionally, the Bezier curve manager 906 generates, obtains, or otherwise accesses legacy path representations of vector images. For instance, the Bezier curve manager 906 generates Bezier curves including end points and control points or other control data to represent paths and objects in the vector images.

The bidirectional vector representation system 102 includes an intermediate representation manager 908 to manage bidirectional intermediate representations for vector images. Specifically, the intermediate representation manager 908 generates bidirectional intermediate representations for digital images for converting between vector network graphs and Bezier curves. For instance, the intermediate representation manager 908 generates a bidirectional intermediate representation from one or more vector network graphs or from one or more sets of Bezier curves.

The bidirectional vector representation system 102 also includes a conversion manager 910 to convert between different path representations of vector images. For instance, the conversion manager 910 utilizes bidirectional intermediate representations from the intermediate representation manager 908 to convert from vector network graphs to Bezier curves. Additionally, the conversion manager 910 utilizes bidirectional intermediate representations from the intermediate representation manager 908 to convert from Bezier curves to vector network graphs.

The bidirectional vector representation system 102 also includes a data storage manager 912 (that comprises a non-transitory computer memory) that stores and maintains data associated with editing vector images utilizing a plurality of path representations. For example, the data storage manager 912 stores vector network graphs, Bezier curves, and bidirectional intermediate representations of vector images. Additionally, the data storage manager 912 stores data associated with converting between different representations, including k-d trees, lookup tables, mappings, and an edge visitor (e.g., computer code for performing functions for traversing bidirectional intermediate representations).

Figure 10:
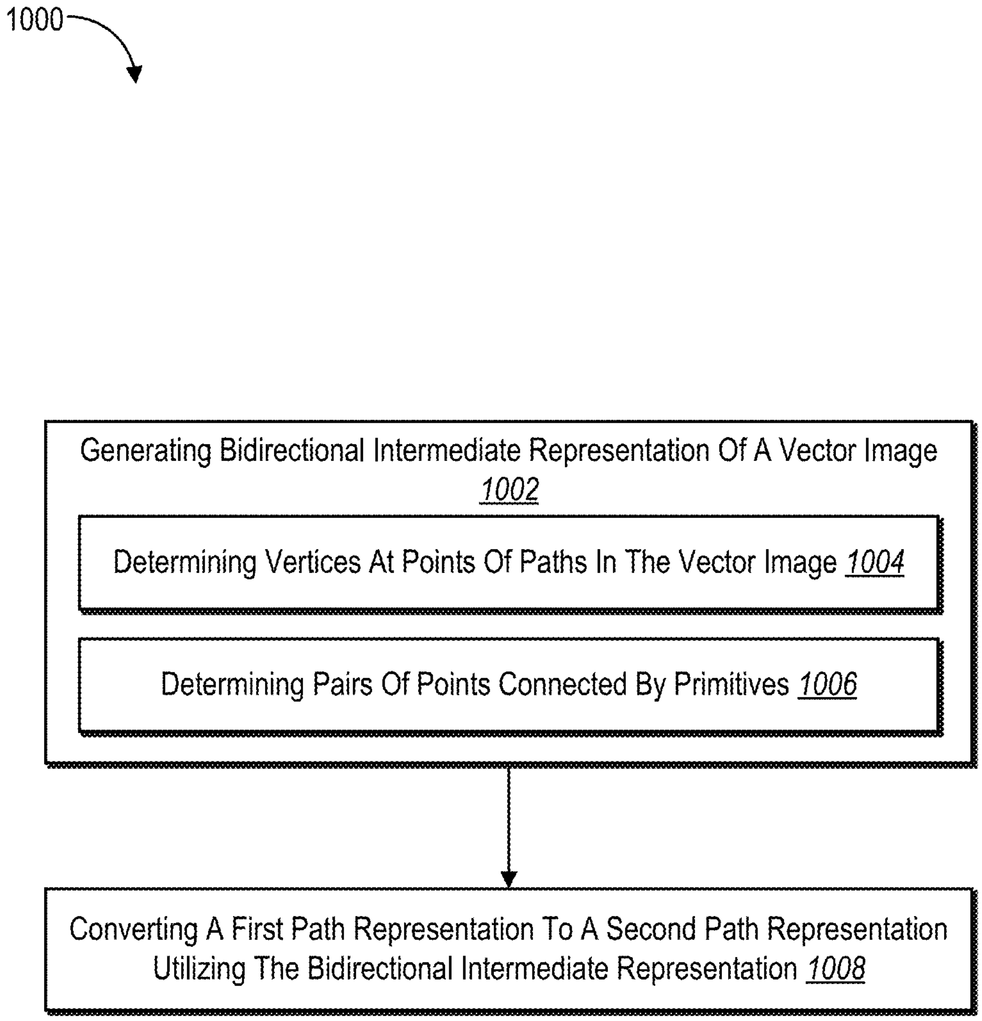
FIG. 10 illustrates a flowchart of a series of acts for utilizing a bidirectional intermediate representation for converting between different representations of a vector image in accordance with one or more implementations.

Turning now to FIG. 10, this figure shows a flowchart of a series of acts 1000 of utilizing bidirectional intermediate representations to convert between vector network graph representations and legacy path representations of paths in vector images. While FIG. 10 illustrates acts according to one embodiment, alternative embodiments may omit, add to, reorder, and/or modify any of the acts shown in FIG. 10. The acts of FIG. 10 are part of a method. Alternatively, a non-transitory computer readable medium comprises instructions, that when executed by one or more processors, cause the one or more processors to perform the acts of FIG. 10. In still further embodiments, a system includes a processor or server configured to perform the acts of FIG. 10.

As shown, the series of acts 1000 includes act 1002 of generating a bidirectional intermediate representation of a vector image. In one or more embodiments, act 1002 includes act 1004 of determining vertices at points of paths in the vector image. Furthermore, act 1002 includes act 1006 of determining pairs of points connected by primitives. The series of acts 1000 also includes act 1008 of converting a first path representation to a second path representation utilizing the bidirectional intermediate representation.

In one or more embodiments, act 1004 involves determining vertices at points of a plurality of paths in a vector image. Additionally, act 1006 involves determining pairs of points connected by primitives corresponding to the plurality of paths. In one or more embodiments, act 1002 involves generating a bidirectional intermediate representation of a vector image comprising the vertices at the points connected by edges representing the primitives according to the pairs of points. Furthermore, act 1008 involves converting a first path representation of the plurality of paths of the vector image to a second path representation of the plurality of paths of the vector image utilizing the bidirectional intermediate representation.

In one or more embodiments, the series of acts 1000 includes determining a set of junctions and pairs of junctions in a vector network graph corresponding to the first path representation. Additionally, the series of acts 1000 includes converting the first path representation to the second path representation by converting the set of junctions and the pairs of junctions in the vector network graph of the first path representation to Bezier curves according to the vertices while traversing the edges of the bidirectional intermediate representation.

In one or more embodiments, the series of acts 1000 includes determining the vertices at coordinates corresponding to the set of junctions from the vector network graph. The series of acts 1000 includes determining the primitives comprising parameterizable curves corresponding to the pairs of junctions from the vector network graph. Additionally, the series of acts 1000 includes generating, within the bidirectional intermediate representation, the edges representing the primitives connecting the vertices according to the parameterizable curves. The series of acts 1000 further includes determining a set of contours comprising one or more primitive sequences forming one or more closed paths in the vector image. Additionally, the series of acts 1000 includes generating a mapping of the set of contours to corresponding vertices and corresponding edges of the bidirectional intermediate representation.

In one or more embodiments, the series of acts 1000 includes determining path data for Bezier curves including end points and control points of the Bezier curves in the first path representation. Additionally, the series of acts 1000 includes converting the first path representation to the second path representation by converting the path data of the Bezier curves including the end points and the control points of the plurality of paths in the first path representation to a vector network graph comprising a set of junctions and pairs of junctions.

In some embodiments, the series of acts 1000 includes determining the vertices at coordinates corresponding to the end points of the Bezier curves from the path data. The series of acts 1000 also includes determining the control points of the Bezier curves from the path data. The series of acts 1000 further includes generating, within the bidirectional intermediate representation, the edges comprising the control points connecting the vertices according to connected Bezier curves in the vector image. Additionally, the series of acts 1000 includes determining a set of contours comprising one or more primitive sequences forming one or more closed paths in the vector image. Furthermore, the series of acts 1000 includes generating a mapping of the set of contours to corresponding vertices and corresponding edges of the bidirectional intermediate representation.

According to one or more embodiments, the series of acts 1000 includes generating the edges by determining the vertices and the edges by utilizing a k-d tree representation of the path data of the Bezier curves to merge a subset of end points of the plurality of paths as a shared point according to a parameterizable radius.

In one or more embodiments, the series of acts 1000 includes determining a sequence of paths that forms a closed path in the vector image. The series of acts 1000 also includes determining a set of contours that map the sequence of paths to corresponding edges of the bidirectional intermediate representation with color information indicating fill data for the closed path.

In one or more embodiments, the series of acts 1000 includes receiving a request to perform an image editing operation on the vector image utilizing an image editing tool associated with the second path representation. The series of acts 1000 also includes converting the first path representation to the second path representation in response to determining that image editing tool is associated with the second path representation. The series of acts 1000 further includes performing, via the image editing tool, the image editing operation utilizing the second path representation in response to converting the first path representation to the second path representation.

In one or more embodiments, the series of acts 1000 includes determining, in response to performing the image editing operation, an updated bidirectional intermediate representation of the vector image according to one or more changes to the second path representation. Additionally, the series of acts 1000 includes generating an updated first path representation utilizing the updated bidirectional intermediate representation.

In one or more embodiments, the series of acts 1000 includes determining, for a vector image comprising a plurality of paths, a first path representation of the plurality of paths comprising a set of junctions corresponding to shared points in the vector image and pairs of junctions corresponding to primitives. The series of acts 1000 includes generating, from the first path representation, a bidirectional intermediate representation of a vector image comprising vertices at the set of junctions connected by edges representing the primitives according to the pairs of junctions. The series of acts 1000 further includes generating, utilizing the bidirectional intermediate representation in connection with a request to perform an image editing operation on the vector image, a second path representation of the plurality of paths by generating path data according to the vertices while traversing the edges of the bidirectional intermediate representation. Additionally, the series of acts 1000 includes performing the image editing operation according to the path data from the second path representation.

In one or more embodiments, the series of acts 1000 includes determining that the image editing operation corresponds to an image editing tool that modifies data in a path space corresponding to the second path representation. Additionally, the series of acts 1000 includes converting the first path representation to the second path representation in response to determining that the image editing operation corresponds to the image editing tool.

In some embodiments, the series of acts 1000 includes determining one or more changes to the second path representation in the path space corresponding to the second path representation based on the image editing operation. Furthermore, the series of acts 1000 generating an updated bidirectional intermediate representation based on the one or more changes to the second path representation.

In one or more embodiments, the series of acts 1000 determining the first path representation as a vector network graph comprising the set of junctions and the pairs of junctions. Additionally, the series of acts 1000 includes generating, utilizing the bidirectional intermediate representation, the second path representation as a plurality of Bezier curves comprising end points based on the vertices and control points based on the primitives.

In one or more embodiments, the series of acts 1000 includes determining, from the first path representation, one or more primitives that form a closed path in the vector image. Additionally, the series of acts 1000 includes determining color information indicating fill data for the closed path. The series of acts 1000 also includes generating a set of contours that map the one or more primitives to one or more edges of the bidirectional intermediate representation with the color information. In some embodiments, the series of acts 1000 includes generating the second path representation by iterating through the set of contours to construct a closed path object including one or more Bezier curves from the one or more edges. Additionally, the series of acts 1000 includes assigning the color information to the one or more Bezier curves based on the set of contours in the bidirectional intermediate representation.

In one or more embodiments, the series of acts 1000 includes generating the bidirectional intermediate representation by generating a data structure comprising the vertices including coordinates of the set of junctions and the edges with primitive types and control points of the primitives.

In one or more embodiments, the series of acts 1000 includes determining, for a vector image comprising a plurality of paths, a first path representation of the plurality of paths comprising path data including end points and control points of the plurality of paths. The series of acts 1000 also includes generating, from the first path representation, a bidirectional intermediate representation of a vector image comprising vertices of the end points connected by edges representing the plurality of paths according to the control points of the plurality of paths. The series of acts 1000 also includes generating, utilizing the bidirectional intermediate representation, a second path representation of the plurality of paths comprising a graph including a set of junctions corresponding to the vertices and primitives corresponding to the edges.

In one or more embodiments, the series of acts 1000 includes determining that a first end point of the path data is within a threshold distance of a second end point of the path data. The series of acts 1000 further includes merging the first end point and the second end point as a single vertex.

In one or more embodiments, the series of acts 1000 includes determining that one or more paths of the plurality of paths form a closed path according to the path data of the first path representation. The series of acts 1000 further includes determining color information associated with the one or more paths. The series of acts 1000 also includes determining a set of contours that map an edge sequence corresponding to the one or more paths to a primitive sequence with color information indicating fill data for the closed path.

In one or more embodiments, the series of acts 1000 includes detecting an image editing operation that modifies the first path representation according to one or more changes to the path data. The series of acts 1000 also includes generating an updated bidirectional intermediate representation based on the one or more changes to the path data. Additionally, the series of acts 1000 includes generating an updated second path representation utilizing the updated bidirectional intermediate representation.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction and scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
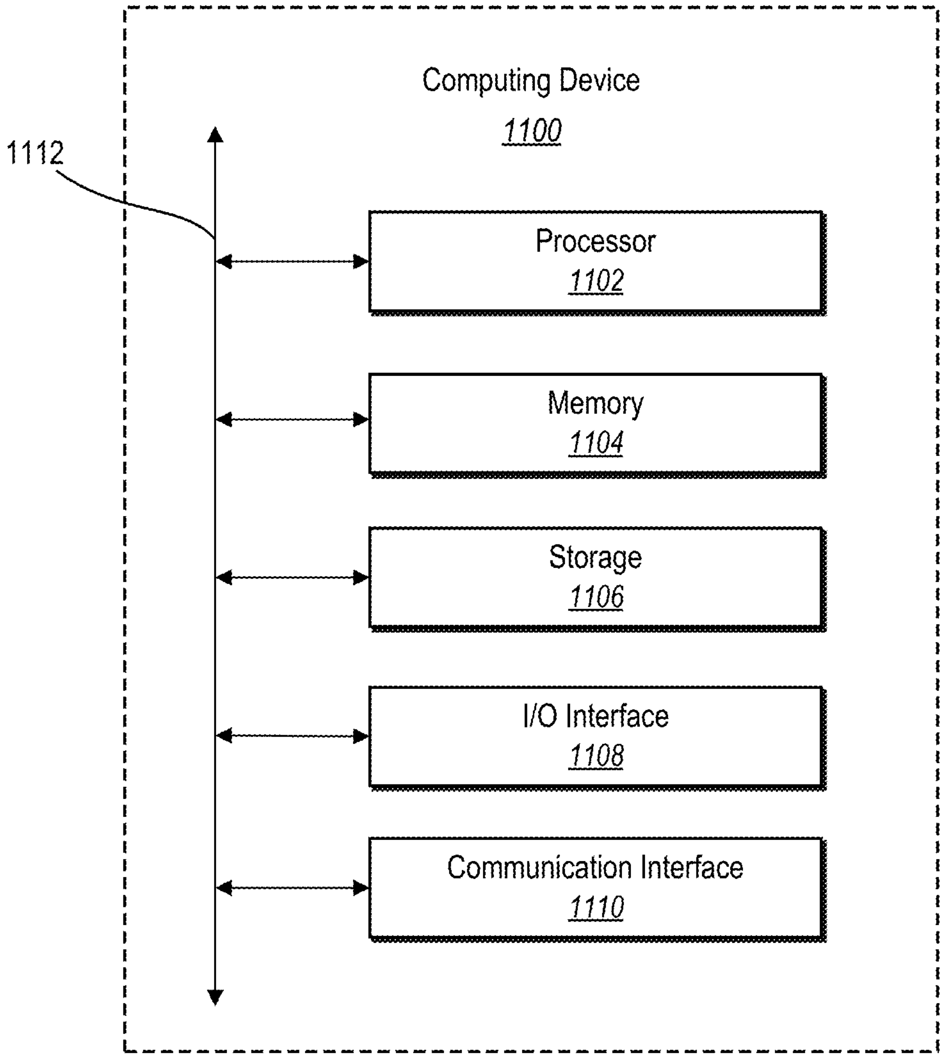
FIG. 11 illustrates a block diagram of an exemplary computing device in accordance with one or more implementations.

FIG. 11 illustrates a block diagram of exemplary computing device 1100 that may be configured to perform one or more of the processes described above. One will appreciate that one or more computing devices such as the computing device 1100 may implement the system(s) of FIG. 1. As shown by FIG. 11, the computing device 1100 can comprise a processor 1102, a memory 1104, a storage device 1106, an I/O interface 1108, and a communication interface 1110, which may be communicatively coupled by way of a communication infrastructure 1112. In certain embodiments, the computing device 1100 can include fewer or more components than those shown in FIG. 11. Components of the computing device 1100 shown in FIG. 11 will now be described in additional detail.

In one or more embodiments, the processor 1102 includes hardware for executing instructions, such as those making up a computer program. As an example, and not by way of limitation, to execute instructions for dynamically modifying workflows, the processor 1102 may retrieve (or fetch) the instructions from an internal register, an internal cache, the memory 1104, or the storage device 1106 and decode and execute them. The memory 1104 may be a volatile or non-volatile memory used for storing data, metadata, and programs for execution by the processor(s). The storage device 1106 includes storage, such as a hard disk, flash disk drive, or other digital storage device, for storing data or instructions for performing the methods described herein.

The I/O interface 1108 allows a user to provide input to, receive output from, and otherwise transfer data to and receive data from computing device 1100. The I/O interface 1108 may include a mouse, a keypad or a keyboard, a touch screen, a camera, an optical scanner, network interface, modem, other known I/O devices or a combination of such I/O interfaces. The I/O interface 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1108 is configured to provide graphical data to a display for presentation to a user. The graphical data may be representative of one or more graphical user interfaces and/or any other graphical content as may serve a particular implementation.

The communication interface 1110 can include hardware, software, or both. In any event, the communication interface 1110 can provide one or more interfaces for communication (such as, for example, packet-based communication) between the computing device 1100 and one or more other computing devices or networks. As an example, and not by way of limitation, the communication interface 1110 may include a network interface controller (NIC) or network adapter for communicating with an Ethernet or other wire-based network or a wireless NIC (WNIC) or wireless adapter for communicating with a wireless network, such as a WI-FI.

Additionally, the communication interface 1110 may facilitate communications with various types of wired or wireless networks. The communication interface 1110 may also facilitate communications using various communication protocols. The communication infrastructure 1112 may also include hardware, software, or both that couples components of the computing device 1100 to each other. For example, the communication interface 1110 may use one or more networks and/or protocols to enable a plurality of computing devices connected by a particular infrastructure to communicate with each other to perform one or more aspects of the processes described herein. To illustrate, the digital content campaign management process can allow a plurality of devices (e.g., a client device and server devices) to exchange information using various communication networks and protocols for sharing information such as electronic messages, user interaction information, engagement metrics, or campaign management resources.

In the foregoing specification, the present disclosure has been described with reference to specific exemplary embodiments thereof. Various embodiments and aspects of the present disclosure(s) are described with reference to details discussed herein, and the accompanying drawings illustrate the various embodiments. The description above and drawings are illustrative of the disclosure and are not to be construed as limiting the disclosure. Numerous specific details are described to provide a thorough understanding of various embodiments of the present disclosure.

The present disclosure may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

What is claimed is:

1. A computer-implemented method comprising:

determining, by at least one processor, a first set of path data including vertices at points of a plurality of paths in a first path representation of a vector image, the vertices comprising end points of Bezier curves or junctions in a vector network graph;

determining, by the at least one processor, a second set of path data including pairs of points connected by primitives corresponding to the plurality of paths in the first path representation of the vector image, the pairs of points connected by the primitives comprising the Bezier curves or vector graph network primitives corresponding to pairs of junctions in the vector network graph;

generating, by the at least one processor, a bidirectional intermediate representation of the vector image comprising the vertices at the points connected by edges representing the primitives according to the pairs of points, wherein the bidirectional intermediate representation comprises vertices, edges, and edge sequence mappings for converting between the Bezier curves and the vector network graph; and converting, by the at least one processor, the first path representation of the plurality of paths of the vector image to a second path representation of the plurality of paths of the vector image utilizing the bidirectional intermediate representation.

2. The computer-implemented method of claim 1, further comprising determining the junctions and the pairs of junctions in the vector network graph corresponding to the first path representation, wherein converting the first path representation to the second path representation comprises converting the junctions and the pairs of junctions in the vector network graph of the first path representation to Bezier curves according to the vertices while traversing the edges of the bidirectional intermediate representation.

3. The computer-implemented method of claim 2, wherein generating the bidirectional intermediate representation comprises:

determining the vertices at coordinates corresponding to the junctions from the vector network graph;

determining the primitives comprising parameterizable curves corresponding to the pairs of junctions from the vector network graph;

generating, within the bidirectional intermediate representation, the edges representing the primitives connecting the vertices according to the parameterizable curves;

determining a set of contours comprising one or more primitive sequences forming one or more closed paths in the vector image; and generating a mapping of the set of contours to corresponding vertices and corresponding edges of the bidirectional intermediate representation.

4. The computer-implemented method of claim 1, further comprising determining path data for Bezier curves including end points and control points of the Bezier curves in the first path representation, wherein converting the first path representation to the second path representation comprises converting the path data of the Bezier curves including the end points and the control points of the plurality of paths in the first path representation to the vector network graph comprising the junctions and pairs of junctions.

5. The computer-implemented method of claim 4, wherein generating the bidirectional intermediate representation comprises:

determining the vertices at coordinates corresponding to the end points of the Bezier curves from the path data;

determining the control points of the Bezier curves from the path data;

generating, within the bidirectional intermediate representation, the edges comprising the control points connecting the vertices according to connected Bezier curves in the vector image;

determining a set of contours comprising one or more primitive sequences forming one or more closed paths in the vector image; and generating a mapping of the set of contours to corresponding vertices and corresponding edges of the bidirectional intermediate representation.

6. The computer-implemented method of claim 5, wherein generating the edges comprises determining the vertices and the edges by utilizing a k-d tree representation of the path data of the Bezier curves to merge a subset of end points of the plurality of paths as a shared point according to a parameterizable radius.

7. The computer-implemented method of claim 1, wherein generating the bidirectional intermediate representation comprises:

determining a sequence of paths that forms a closed path in the vector image; and determining a set of contours that map the sequence of paths to corresponding edges of the bidirectional intermediate representation with color information indicating fill data for the closed path.

8. The computer-implemented method of claim 1, wherein converting the first path representation to the second path representation comprises:

receiving a request to perform an image editing operation on the vector image utilizing an image editing tool associated with the second path representation;

converting the first path representation to the second path representation in response to determining that image editing tool is associated with the second path representation; and performing, via the image editing tool, the image editing operation utilizing the second path representation in response to converting the first path representation to the second path representation.

9. The computer-implemented method of claim 8, further comprising:

determining, in response to performing the image editing operation, an updated bidirectional intermediate representation of the vector image according to one or more changes to the second path representation; and generating an updated first path representation utilizing the updated bidirectional intermediate representation.

10. A system comprising:

one or more memory devices; and one or more processors configured to cause the system to:

determine, for a vector image comprising a plurality of paths, a first path representation of the plurality of paths comprising a set of junctions corresponding to shared points in the vector image and pairs of junctions corresponding to primitives within a vector network graph;

generate, from the first path representation, a bidirectional intermediate representation of a vector image comprising vertices at the set of junctions connected by edges representing the primitives according to the pairs of junctions, wherein the bidirectional intermediate representation comprises vertices, edges, and edge sequence mappings for converting between Bezier curves and the vector network graph;

generate, utilizing the bidirectional intermediate representation in connection with a request to perform an image editing operation on the vector image, a second path representation of the plurality of paths by generating path data according to the vertices while traversing the edges of the bidirectional intermediate representation, the vertices comprising end points of Bezier curves; and perform the image editing operation according to the path data from the second path representation.

11. The system of claim 10, wherein the one or more processors are configured to cause the system to generate the second path representation by:

determining that the image editing operation corresponds to an image editing tool that modifies data in a path space corresponding to the second path representation; and converting the first path representation to the second path representation in response to determining that the image editing operation corresponds to the image editing tool.

12. The system of claim 11, wherein the one or more processors are configured to cause the system to:

determine one or more changes to the second path representation in the path space corresponding to the second path representation based on the image editing operation; and generate an updated bidirectional intermediate representation based on the one or more changes to the second path representation.

13. The system of claim 10, wherein the one or more processors are configured to cause the system to:

determine the first path representation as the vector network graph comprising the set of junctions and the pairs of junctions; and generate, utilizing the bidirectional intermediate representation, the second path representation as a plurality of Bezier curves comprising end points based on the vertices and control points based on the primitives.

14. The system of claim 10, wherein the one or more processors are configured to cause the system to generate the bidirectional intermediate representation by:

determining, from the first path representation, one or more primitives that form a closed path in the vector image;

determining color information indicating fill data for the closed path; and generating a set of contours that map the one or more primitives to one or more edges of the bidirectional intermediate representation with the color information.

15. The system of claim 14, wherein the one or more processors are configured to cause the system to:

generate the second path representation by iterating through the set of contours to construct a closed path object including one or more Bezier curves from the one or more edges; and assign the color information to the one or more Bezier curves based on the set of contours in the bidirectional intermediate representation.

16. The system of claim 10, wherein the one or more processors are configured to cause the system to generate the bidirectional intermediate representation by generating a data structure comprising the vertices including coordinates of the set of junctions and the edges with primitive types and control points of the primitives.

17. A non-transitory computer readable medium storing instructions thereon that, when executed by at least one processor, cause the at least one processor to perform operations comprising:

determining, for a vector image comprising a plurality of paths, a first path representation of the plurality of paths comprising path data including end points and control points of the plurality of paths, the path data corresponding to Bezier curves;

generating, from the first path representation, a bidirectional intermediate representation of a vector image comprising vertices of the end points connected by edges representing the plurality of paths according to the control points of the plurality of paths, wherein the bidirectional intermediate representation comprises vertices, edges, and edge sequence mappings for converting between the Bezier curves and a vector network graph; and generating, utilizing the bidirectional intermediate representation, a second path representation of the plurality of paths comprising a vector network graph including a set of junctions corresponding to the vertices and primitives corresponding to the edges.

18. The non-transitory computer readable medium of claim 17, wherein generating the bidirectional intermediate representation comprises:

determining that a first end point of the path data is within a threshold distance of a second end point of the path data; and merging the first end point and the second end point as a single vertex.

19. The non-transitory computer readable medium of claim 17, wherein generating the bidirectional intermediate representation comprises:

determining that one or more paths of the plurality of paths form a closed path according to the path data of the first path representation;

determining color information associated with the one or more paths; and determining a set of contours that map an edge sequence corresponding to the one or more paths to a primitive sequence with color information indicating fill data for the closed path.

20. The non-transitory computer readable medium of claim 17, wherein generating the second path representation comprises:

detecting an image editing operation that modifies the first path representation according to one or more changes to the path data;

generating an updated bidirectional intermediate representation based on the one or more changes to the path data; and generating an updated second path representation utilizing the updated bidirectional intermediate representation.

* * * * *